United States Patent
Szczerba et al.

(10) Patent No.: US 12,124,641 B1
(45) Date of Patent: Oct. 22, 2024

(54) TRANSLATING ROTARY CONTROL

(71) Applicant: GM Global Technology Operations LLC, Detroit, MI (US)

(72) Inventors: Joseph F. Szczerba, Grand Blanc, MI (US); Ki Hyun Ahn, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/302,155

(22) Filed: Apr. 18, 2023

(51) Int. Cl.
*G06F 3/0354* (2013.01)
*G06F 3/0362* (2013.01)
*G06F 3/038* (2013.01)
*G06F 3/14* (2006.01)
*B60K 35/10* (2024.01)

(52) U.S. Cl.
CPC ........ *G06F 3/03548* (2013.01); *G06F 3/0362* (2013.01); *G06F 3/038* (2013.01); *G06F 3/1423* (2013.01); *B60K 35/10* (2024.01); *B60K 2360/126* (2024.01)

(58) Field of Classification Search
CPC ...................................................... G06F 3/016
USPC ................ 345/156, 174, 169, 168, 173, 206
See application file for complete search history.

(56) References Cited

U.S. PATENT DOCUMENTS

| | | | | |
|---|---|---|---|---|
| 5,805,146 A | * | 9/1998 | Jaeger | G02F 1/13338 345/184 |
| 2007/0267283 A1 | * | 11/2007 | Hiroe | B60K 35/10 200/179 |
| 2011/0032186 A1 | * | 2/2011 | Genesin | G06F 3/0338 345/161 |
| 2017/0153718 A1 | * | 6/2017 | Brown | B60K 35/10 |
| 2018/0188535 A1 | * | 7/2018 | Quiroz de la mora | G02B 27/0149 |
| 2018/0229704 A1 | * | 8/2018 | Eck | B60T 13/66 |

* cited by examiner

*Primary Examiner* — William Boddie
*Assistant Examiner* — Alecia D English
(74) *Attorney, Agent, or Firm* — Vivacqua Crane, PLLC

(57) ABSTRACT

A human machine interface (HMI) within a vehicle includes a display screen adapted to display information to an occupant within the vehicle, a track extending along at least a portion of a peripheral edge of the display screen, and a rotary control knob assembly slidably supported within the track for sliding movement within the track, wherein, the rotary control knob assembly is adapted to allow the occupant of the vehicle to provide input to the HMI to control a selected one of a plurality of systems within the vehicle, the selected one of the plurality of systems determined by a position of the rotary control knob assembly within the track.

20 Claims, 8 Drawing Sheets

TRANSLATING ROTARY CONTROL

INTRODUCTION

The present disclosure relates to a human machine interface within a vehicle. Current human machine interfaces within vehicle include buttons and touch screens that require an occupant to look directly at them to properly provide input to the human machine interface to control onboard vehicle systems.

Thus, while current systems and methods achieve their intended purpose, there is a need for a new and improved system and method for providing input to a vehicle human machine interface that does not require an occupant of the vehicle to look down at the human machine interface.

SUMMARY

According to several aspects of the present disclosure, a human machine interface (HMI) within a vehicle includes a display screen adapted to display information to an occupant within the vehicle, a track extending along at least a portion of a peripheral edge of the display screen, and a rotary control knob assembly slidably supported within the track for sliding movement within the track, wherein, the rotary control knob assembly is adapted to allow the occupant of the vehicle to provide input to the HMI to control a selected one of a plurality of systems within the vehicle, the selected one of the plurality of systems determined by a position of the rotary control knob assembly within the track.

According to another aspect, the track defines a channel, the channel including a plurality of electrically conductive rails in communication within a controller.

According to another aspect, the rotary control knob assembly includes a base adapted to be slidably received within the channel of the track, the base including a plurality of flexible electrically conductive fingers that are biased outward and adapted to contact the plurality of conductive rails within the channel of the track for electrical communication between the base of the rotary control knob assembly and the controller, a neck portion adapted to extend outward from the base through a slot formed within the track, and a knob portion adapted to allow engagement of the rotary control knob assembly by the occupant of the vehicle, via rotation of the knob portion.

According to another aspect, the base has a four sided shape, each of the four sides including a plurality of flexible electrically conductive fingers that are biased outward and adapted to contact the plurality of conductive rails within the channel of the track, such that the rotary control knob assembly can transition from a horizontal portion of the track to a vertical portion of the track and maintain electrical communication between the base of the rotary control knob assembly and the controller.

According to another aspect, at least one of the plurality of conductive rails within the channel of the track is adapted to communicate with at least one of the plurality of flexible electrically conductive fingers to allow the controller to determine a location of the rotary control knob assembly within the track, at least one of the plurality of conductive rails within the channel of the track is adapted to communicate with at least one of the plurality of flexible electrically conductive fingers to provide power to the rotary control knob assembly, and at least one of the plurality of conductive rails within the channel of the track is adapted to communicate with at least one of the plurality of flexible electrically conductive fingers to allow input by the occupant of the vehicle, via the knob portion of the rotary control knob assembly, to be communicated to the controller.

According to another aspect, the at least one of the plurality of conductive rails within the channel of the track that is adapted to communicate with at least one of the plurality of flexible electrically conductive fingers to allow the controller to determine a location of the rotary control knob assembly within the track includes a plurality of short segments each individually in communication with the controller.

According to another aspect, the base of the rotary control knob assembly includes an encoder adapted to convert input from the occupant of the vehicle, via the knob portion of the rotary knob assembly, to a signal that is communicated to the controller.

According to another aspect, the base includes a foot slidably positioned within a secondary channel, the secondary channel adapted to selectively restrict movement of the foot therein to provide reconfigurable detents for the rotary control knob assembly.

According to another aspect, the secondary channel includes a magnetorheological fluid that can selectively be controlled to allow sliding motion of the foot within the secondary channel and to prevent sliding motion of the foot within the secondary channel.

According to another aspect, the knob portion includes a shaft extending downward through the base and the channel includes at least one recessed cavity formed therein, the shaft extending through the base and engaging the recessed cavity to prevent sliding motion of the rotary control knob assembly within the track, the knob portion and the shaft being biased to maintain engagement with the recessed cavity and to allow the occupant to pull the knob and disengage the shaft and the recessed cavity to allow sliding motion of the rotary control knob assembly.

According to another aspect, the knob portion of the rotary control knob assembly includes a secondary display screen, wherein, when the rotary control knob assembly is positioned within the track at a location to control a selected one of the plurality of systems within the vehicle, the secondary display screen is adapted to display features related to the selected one of the plurality of systems.

According to several aspects of the present disclosure, a method of providing input to a human machine interface (HMI) within a vehicle includes moving a rotary control knob assembly that is slidably supported for sliding movement within a track extending along at least a portion of a peripheral edge of a display screen that is adapted to display information to an occupant within the vehicle, stopping movement at a selected position within the track, and inputting, via the rotary control knob assembly, input to the HMI to control a selected one of a plurality of systems within the vehicle, the selected one of the plurality of systems determined by the selected position of the rotary control knob assembly within the track.

According to another aspect, the track defines a channel, the channel including a plurality of electrically conductive rails in communication within a controller, and the rotary control knob assembly includes a base adapted to be slidably received within the channel of the track, the base having a four-sided shape, each of the four sides including a plurality of flexible electrically conductive fingers that are biased outward and adapted to contact the plurality of conductive rails within the channel of the track for electrical communication between the base of the rotary control knob assembly and the controller, a neck portion adapted to extend outward from the base through a slot formed within the track, and a knob portion adapted to allow engagement of the rotary control knob assembly by the occupant of the vehicle, via rotation of the knob portion, wherein, the moving the rotary control knob assembly further includes transitioning from horizontal movement of the rotary control knob assembly within a horizontal portion of the track to vertical movement of the rotary control knob assembly within a vertical portion of the track, and maintaining electrical communication between the base of the rotary control knob assembly and the controller.

According to another aspect, the method further includes determining, with the controller, via communication between at least one of the plurality of conductive rails within the channel of the track and at least one of the plurality of flexible electrically conductive fingers, a location of the rotary control knob assembly within the track, providing power to the rotary control knob assembly, from the controller, via communication between at least one of the plurality of conductive rails within the channel of the track and at least one of the plurality of flexible electrically conductive fingers, and receiving input from the occupant of the vehicle, via the rotary control knob assembly and communicating the input to the controller via communication between at least one of the plurality of conductive rails within the channel of the track and at least one of the plurality of flexible electrically conductive fingers.

According to another aspect, the at least one of the plurality of conductive rails within the channel of the track that is adapted to communicate with at least one of the plurality of flexible electrically conductive fingers to allow the controller to determine a location of the rotary control knob assembly within the track includes a plurality of short segments each individually in communication with the controller, wherein the determining, with the controller, via communication between at least one of the plurality of conductive rails within the channel of the track and at least one of the plurality of flexible electrically conductive fingers, a location of the rotary control knob assembly within the track further includes, determining, with the controller, a location of the rotary control knob assembly, based on which one of the plurality of short segments is in contact with the rotary control knob assembly.

According to another aspect, the receiving input from the occupant of the vehicle, via the rotary control knob assembly and communicating the input to the controller via communication between at least one of the plurality of conductive rails within the channel of the track and at least one of the plurality of flexible electrically conductive fingers further includes converting, with an encoder within the base of the rotary control knob assembly, input from the occupant of the vehicle, via the knob portion of the rotary knob assembly, to a signal that is communicated to the controller.

According to another aspect, the base includes a foot slidably positioned within a secondary channel, the moving the rotary control knob assembly that is slidably supported for sliding movement within the track extending along at least a portion of the peripheral edge of the display screen that is adapted to display information to the occupant within the vehicle further includes selectively actuating a magnetorheological fluid within the secondary channel to one of: allow sliding motion of the foot within the secondary channel and prevent sliding motion of the foot within the secondary channel.

According to another aspect, the knob portion includes a shaft extending downward through the base and the channel includes at least one recessed cavity formed therein, the shaft extending through the base and engaging the recessed cavity to prevent sliding motion of the rotary control knob assembly within the track, the knob portion and the shaft being biased to maintain engagement with the recessed cavity and to allow the occupant to pull the knob and disengage the shaft and the recessed cavity to allow sliding motion of the rotary control knob assembly, the moving the rotary control knob assembly that is slidably supported for sliding movement within the track extending along at least a portion of the peripheral edge of the display screen that is adapted to display information to the occupant within the vehicle further including pulling the knob portion of the rotary control knob assembly outward and disengaging the shaft and the recessed cavity to allow sliding movement of the rotary control knob assembly within the track.

According to another aspect, the knob portion of the rotary control knob assembly includes a secondary display screen, the method further including, when the rotary control knob assembly is positioned within the track at a location to control a selected one of the plurality of systems within the vehicle, displaying, on the secondary display screen, features related to the selected one of the plurality of systems.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
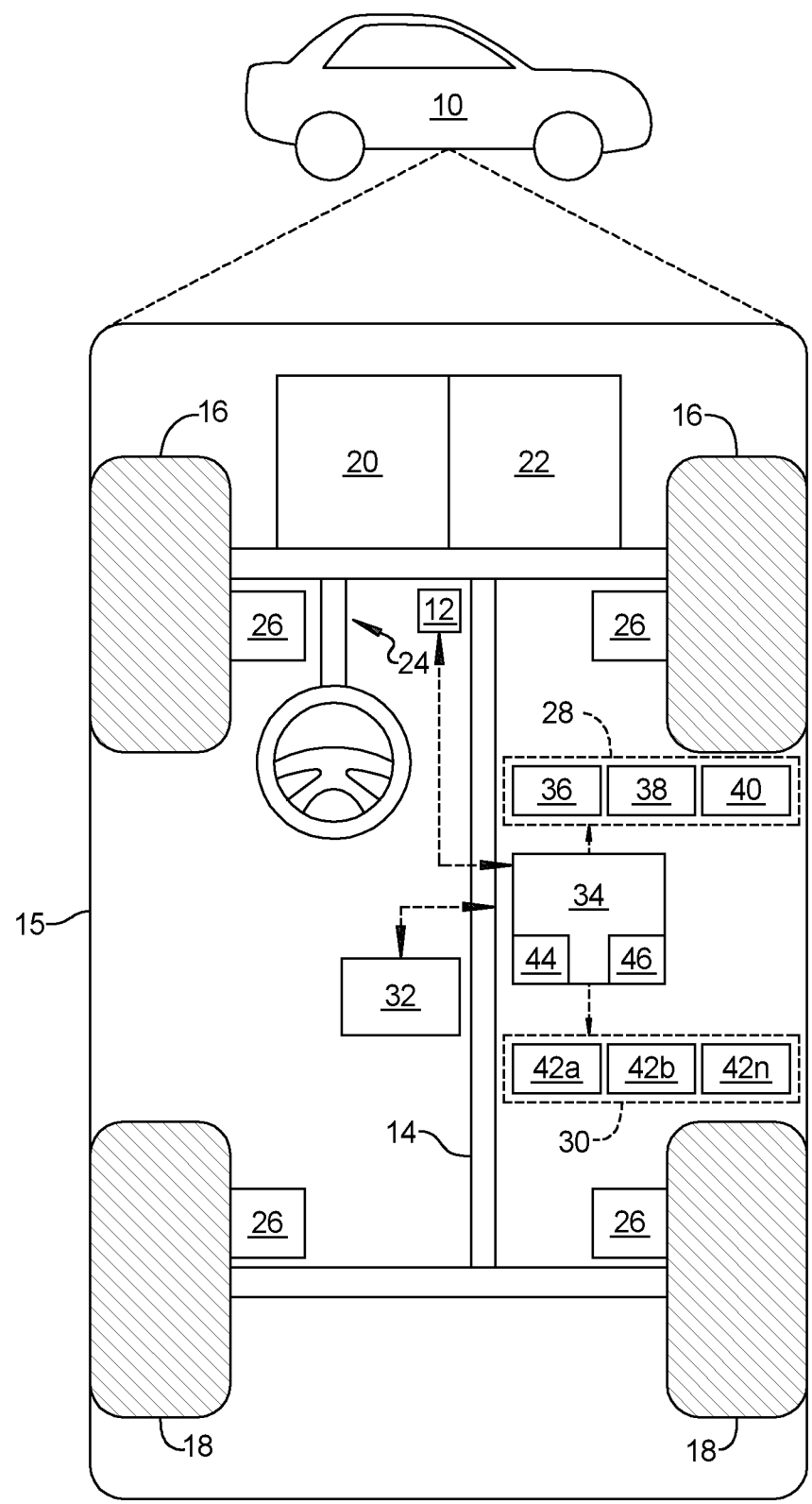
FIG. 1 is a schematic view of a vehicle having a human machine interface (HMI) according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components. Furthermore, the technology may be used with conventional vehicles that are driven by an occupant within the vehicle or autonomous vehicle wherein, to varying degrees, control of the vehicle is autonomous.

In accordance with an exemplary embodiment, FIG. 1 shows a vehicle 10 with an associated human machine interface (HMI) 12 that displays information for an occupant within the vehicle 10 and allows the occupant to provide input to the HMI 12 to control a plurality of systems 28 within the vehicle 10. The vehicle 10 generally includes a chassis 14, a body 15, front wheels 16, and rear wheels 18. The body 15 is arranged on the chassis 14 and substantially encloses components of the vehicle 10. The body 15 and the chassis 14 may jointly form a frame. The front wheels 16 and rear wheels 18 are each rotationally coupled to the chassis 14 near a respective corner of the body 15.

As shown, the vehicle 10 generally includes a propulsion system 20, a transmission system 22, a steering system 24, a brake system 26, a plurality of onboard vehicle systems 28, an actuator system 30, at least one data storage device 32, and a controller 34. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. The plurality of vehicle systems 28 includes, for example, a heating and cooling system 36 for the interior of the vehicle 10, an infotainment system 38 that controls audio and video for the interior of the vehicle 10, and a fan system 40 that controls the fan speed for various climate control fans positioned within the vehicle 10. The actuator system 30 includes one or more actuator devices 42a-42n that control one or more vehicle features such as, but not limited to, the propulsion system 20, the transmission system 22, the steering system 24, and the brake system 26.

The controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from sensors, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 2:
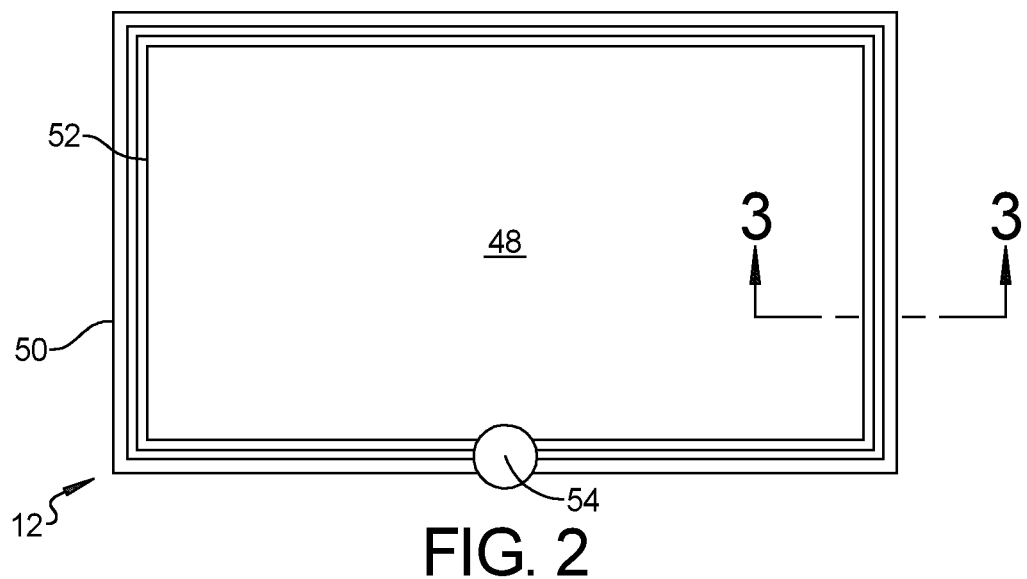
FIG. 2 is a front vie of a display screen for an HMI according to an exemplary embodiment.

Referring to FIG. 2, the HMI 12 includes a display screen 48 adapted to display information to an occupant within the vehicle 10. The display screen 48 is adapted to display information to the occupant within the vehicle 10 related to the onboard vehicle systems 28. The display screen 48 may be any type of display screen 48 suitable for use within a vehicle 10, and may be a touch screen display, which allows the occupant to interact with the HMI 12 and make selections by touching the display screen 48.

A track 50 extends along at least a portion of a peripheral edge 52 of the display screen 48, and a rotary control knob assembly 54 is slidably supported within the track 50 for sliding movement within the track 50 along the peripheral edge 52 of the display screen 48. The rotary control knob assembly 54 is adapted to allow the occupant of the vehicle 10 to provide input to the HMI 12 to control a selected one of a plurality of systems 28 within the vehicle 10, the selected one of the plurality of systems 28 determined by a position of the rotary control knob assembly 54 within the track 50.

Figure 3:
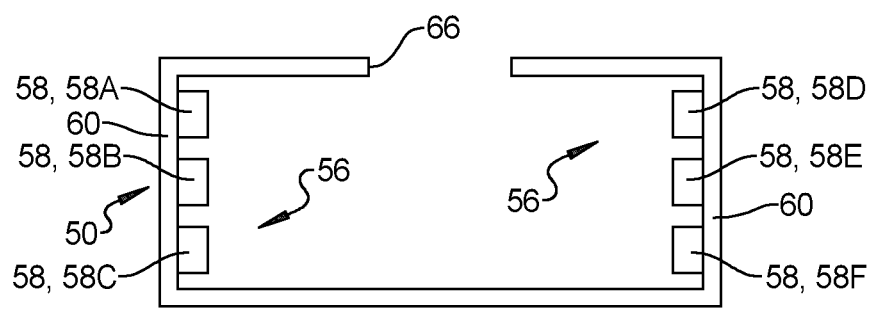
FIG. 3 is a sectional view taken along line 3-3 in FIG. 2.
Figure 4:
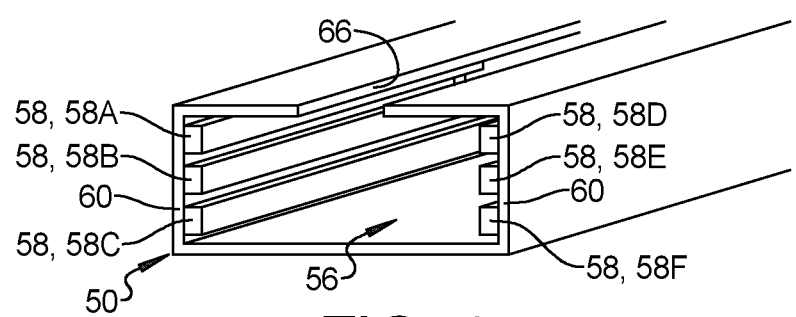
FIG. 4 is a perspective view of a track for the HMI according to an exemplary embodiment.

Referring to FIG. 3 and FIG. 4, the track 50 is shown without the rotary control knob assembly 54 positioned therein. The track 50 defines a channel 56. A plurality of electrically conductive rails 58 are mounted within the channel 56 and are in communication within the controller 34. The track 50 includes side-walls 60 and the plurality of electrically conductive rails 58 are mounted onto the side walls 60.

Figure 5:
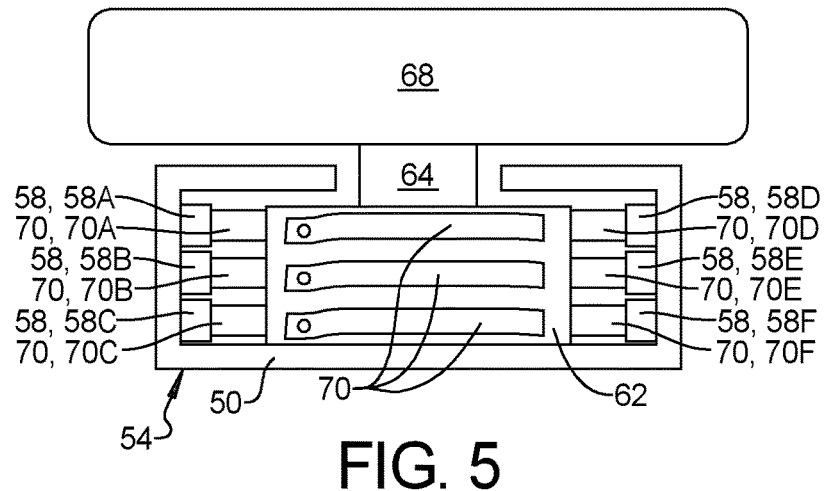
FIG. 5 is a side view of a rotary control knob assembly positioned with a track according to an exemplary embodiment of the present disclosure.

Referring to FIG. 5, the track 50 is shown with the rotary control knob assembly 54 positioned therein. The rotary control knob assembly 54 includes a base 62 adapted to be slidably received within the channel 56 of the track 50. A neck portion 64 extends outward from the base 62 through a slot 66 formed within the track 50, and a knob portion 68 is positioned at a distal end of the neck portion 64, and is adapted to allow engagement of the rotary control knob assembly 54 by the occupant of the vehicle 10, via rotation of the knob portion 68.

The base 62 includes a plurality of flexible electrically conductive fingers 70 that are biased outward and adapted to contact the plurality of conductive rails 58 within the channel 56 of the track 50 for electrical communication between the base 62 of the rotary control knob assembly 54 and the controller 34.

As shown, each of the plurality of flexible electrically conductive fingers 70 is a thin strip of electrically conductive metal that extends outward from the base 62. Each flexible electrically conductive finger 70 is attached to the base 62 by a rivet or a screw, or soldered in place, or any other suitable method of attachment. Each of the flexible electrically conductive fingers 70 extends outward such that when the base 62 of the rotary control knob assembly 54 is positioned within the channel 56 of the track 50, some of the plurality of flexible electrically conductive fingers 70 contact the plurality of electrically conductive rails 58. The dimensions of the track 50 and the base 62 cause the flexible electrically conductive fingers 70 to be compressed or flexed between the base 62 and the electrically conductive rails 58 of the track 50, thereby maintaining contact. It should be understood that other methods of providing for a biased electrical contact between the base 62 and the electrically conductive rails 58 may be utilized without departing from the scope of the present disclosure.

In an exemplary embodiment, the base 62 has a four sided shape, each of the four sides including a plurality of flexible electrically conductive fingers 70 that are biased outward and adapted to contact the plurality of conductive rails 58 within the channel 56 of the track 50, such that the rotary control knob assembly 54 can transition from a horizontal portion 50H of the track 50 to a vertical portion 50V of the track 50 and maintain electrical communication between the base of the rotary control knob assembly and the controller.

Figure 6:
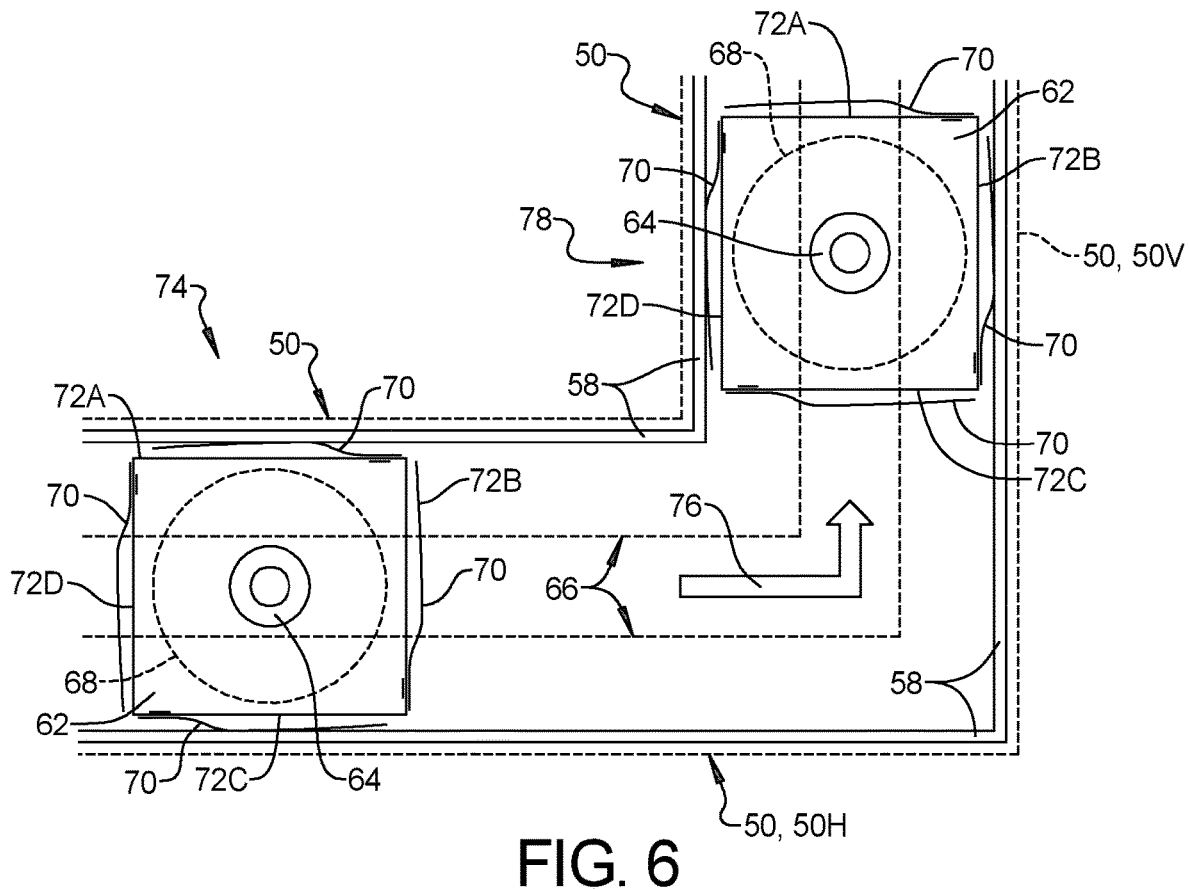
FIG. 6 is a schematic top view illustrating movement of the rotary control knob assembly from a first position within a horizontal portion of the track to a second position within a vertical portion of the track.

Referring to FIG. 6, the base 62 of the rotary control knob assembly 54 includes four sides, a first side 72A, a second side 72B, a third side 72C and a fourth side 72D. Each of the first, second, third and fourth sides 72A, 72B, 72C, 72D of the rotary control knob assembly 54 include flexible electrically conductive fingers 70. When the rotary control knob assembly 54 is located at a first position 74, the flexible electrically conductive fingers 70 on the first and third sides 72A, 72C of the base 62 extend outward and contact the electrically conductive rails 58 of the track 50. If the rotary control knob assembly 54 is moved horizontally to the right, and then vertically upward within the track 50, as indicated by arrow 76, the rotary control knob assembly 54 transitions from the horizontal portion 50H of the track 50 to the vertical portion 50V of the track 50. When the rotary control knob assembly 54 is located at a second position 78, the flexible electrically conductive fingers 70 on the second and fourth sides 72B, 72D of the base 62 extend outward and contact the electrically conductive rails 58 of the track 50.

Figure 7:
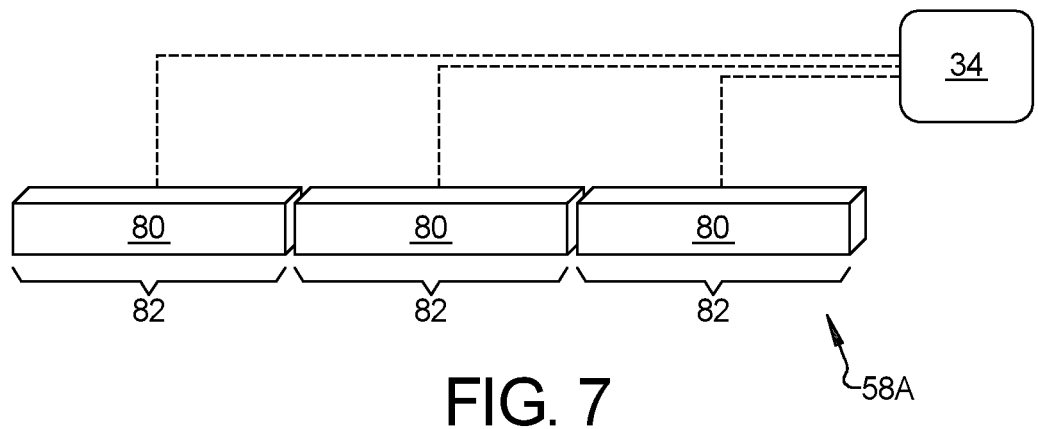
FIG. 7 is schematic view of a first conductive rail that includes a plurality of short segments.

Referring again to FIG. 3, FIG. 4 and FIG. 5, at least one of the plurality of conductive rails 58 within the channel 56 of the track 50 is adapted to communicate with at least one of the plurality of flexible electrically conductive fingers 70 to allow the controller 34 to determine a location of the rotary control knob assembly 54 within the track 50. In an exemplary embodiment, as shown, a first conductive rail 58A is a position rail that is in communication with the controller 34 and in contact with a first flexible electrically conductive finger 70A. Referring to FIG. 7, in another exemplary embodiment, the first conductive rail 58A includes a plurality of short segments 80 each individually in communication with the controller 34. Thus, the controller 34 can determine the location of the rotary control knob assembly 54 based on which one of the plurality of short segments 80 of the first conductive rail 58A the first flexible electrically conductive finger 70A is in contact with. Each of the short segments 80 of the first conductive rail 58A defines a region 82, wherein one region 82 or multiple adjacent regions 82 may define a position for the rotary control knob assembly 54, wherein when the rotary control knob assembly 54 is positioned within a specific region 82, the rotary control knob assembly 54 will allow the occupant to provide input to the controller 34, via the rotary control knob assembly 54, for a selected one of the plurality of vehicle systems 28 that is associated with that region 82.

Referring again to FIG. 3, FIG. 4 and FIG. 5, at least one of the plurality of conductive rails 58 within the channel 56 of the track 50 is adapted to communicate with at least one of the plurality of flexible electrically conductive fingers 70 to provide power to the rotary control knob assembly 54. In an exemplary embodiment, as shown, a second conductive rail 58B and a third conductive rail 58C are power rails that are in contact with a second flexible electrically conductive finger 70B and third flexible electrically conductive finger 70C, and are adapted to provide power to the base 62 of the rotary control knob assembly 54.

Referring again to FIG. 3, FIG. 4 and FIG. 5, at least one of the plurality of conductive rails 58 within the channel 56 of the track 50 is adapted to communicate with at least one of the plurality of flexible electrically conductive fingers 70 to allow input by the occupant of the vehicle 10, via the knob portion 68 of the rotary control knob assembly 54, to be communicated to the controller 34. In an exemplary embodiment, as shown, a fourth conductive rail 58D, a fifth conductive rail 58E and a sixth conductive rail 58F are input rails that are in contact with a fourth flexible electrically conductive finger 70D, a fifth flexible electrically conductive finger 70E, and a sixth flexible electrically conductive finger 70F, respectively. The fourth conductive rail 58D, the fifth conductive rail 58E and the sixth conductive rail 58F, through contact with the fourth flexible electrically conductive finger 70D, the fifth flexible electrically conductive finger 70E, and the sixth flexible electrically conductive finger 70F, carry input from the occupant of the vehicle 10, via the knob portion 68 of the rotary control knob assembly 54, to the controller 34. In an exemplary embodiment, the fourth conductive rail 58D, and the fifth conductive rail 58E along with the fourth flexible electrically conductive finger 70D, and the fifth flexible electrically conductive finger 70E transfer input that is encoded from clockwise and counter-clockwise rotation of the knob portion 68, and the sixth conductive rail 58F with the sixth flexible electrically conductive finger 70F transfer selection input when the occupant presses the knob portion 68 of the rotary control knob assembly 54.

Figure 8:
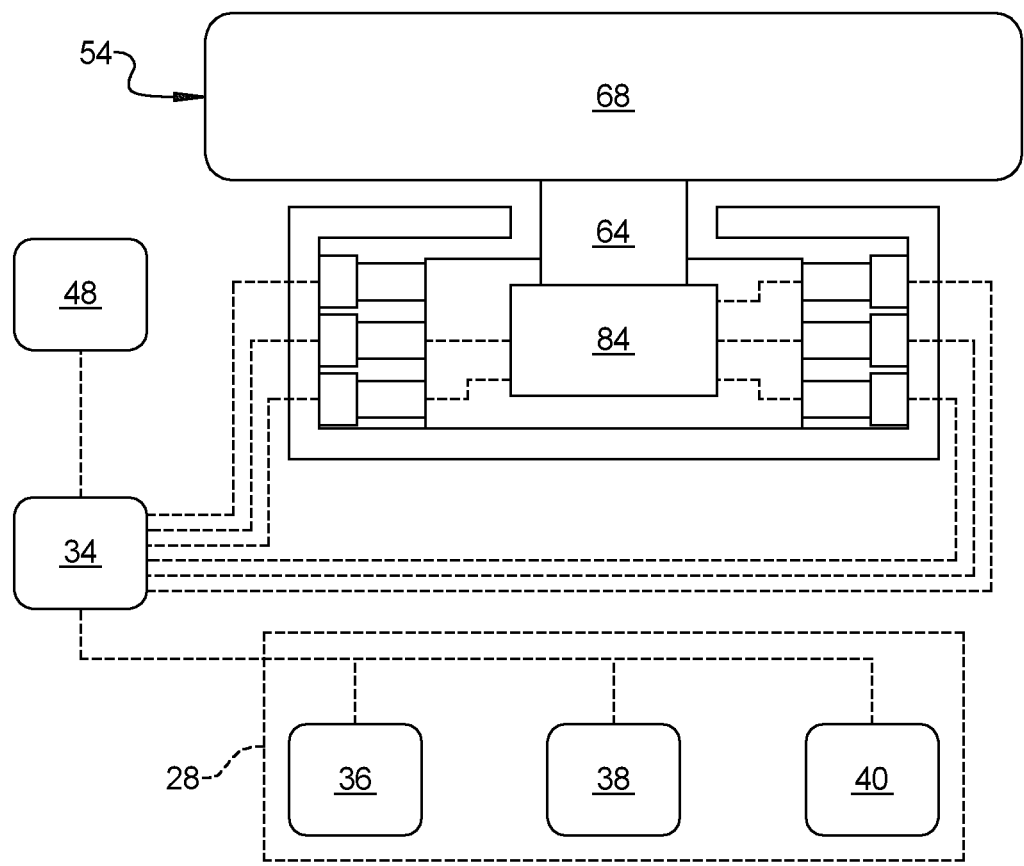
FIG. 8 is schematic view of the HMI according to an exemplary embodiment of the present disclosure.

Referring to FIG. 8, in an exemplary embodiment, the base 62 of the rotary control knob assembly 54 includes an encoder 84 adapted to convert input from the occupant of the vehicle 10, via the knob portion 68 of the rotary control knob assembly 54, to a signal that is communicated to the controller 34. The encoder 84, also called a rotary encoder or shaft encoder, is an electro-mechanical device that converts the angular position or motion of a shaft (here the knob portion 68 of the rotary control knob assembly 54) to analog or digital output signals. The rotary control knob assembly 54 may also be equipped to receive input from the occupant of the vehicle 10 when the occupant pushes the knob portion 68 of the rotary control knob assembly 54.

Figure 9:
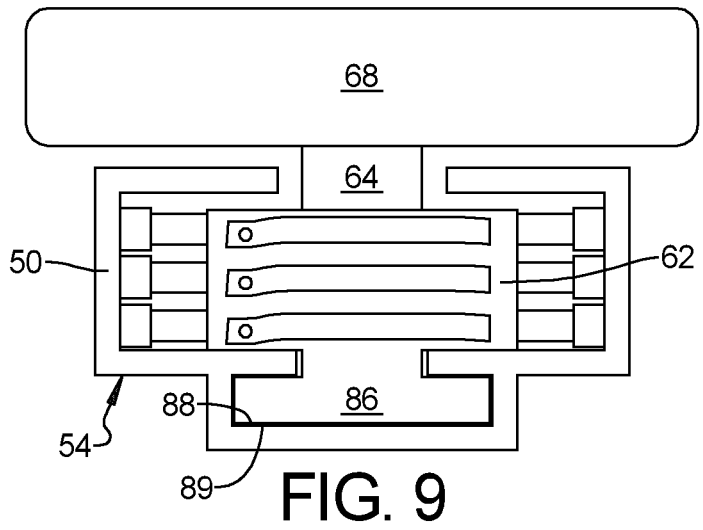
FIG. 9 is a side view of a rotary control knob assembly positioned with a track according to an exemplary embodiment of the present disclosure, wherein the base of the rotary control knob assembly includes a foot slidably positioned within a secondary channel.

Referring to FIG. 9, in an exemplary embodiment, the base 62 includes a foot 86 slidably positioned within a secondary channel 88. The secondary channel 88 is adapted to selectively restrict movement of the foot 86 therein to provide reconfigurable detents for the rotary control knob assembly 54. Such detents would allow the occupant of the vehicle 10 to reach over and move the rotary control knob assembly 54 from one position to another without taking their eyes off the road. Once the occupant feels the next detent position, the occupant will know that the rotary control knob assembly 54 is at the next position. In one exemplary embodiment, the secondary channel 88 includes a magnetorheological fluid that can selectively be controlled to allow sliding motion of the foot 86 within the secondary channel 88 and to prevent sliding motion of the foot 86 within the secondary channel 88.

Figure 10:
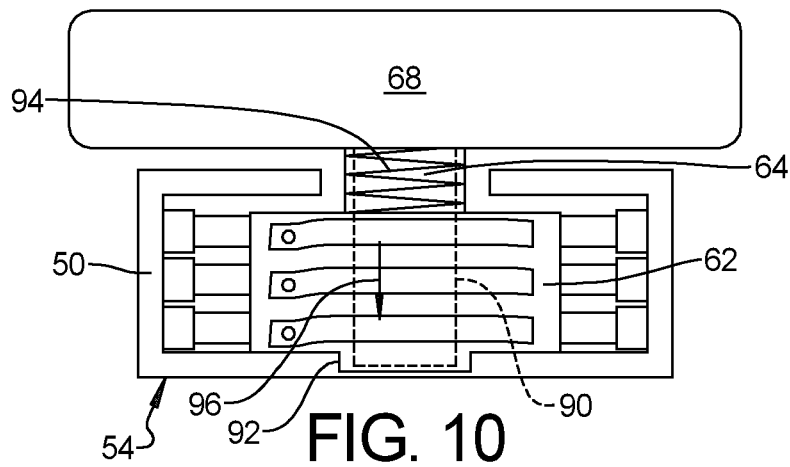
FIG. 10 is a side view of a rotary control knob assembly positioned with a track according to an exemplary embodiment of the present disclosure, wherein the rotary control knob assembly includes a shaft extending through the base and engaging a recessed cavity within the track.
Figure 11:
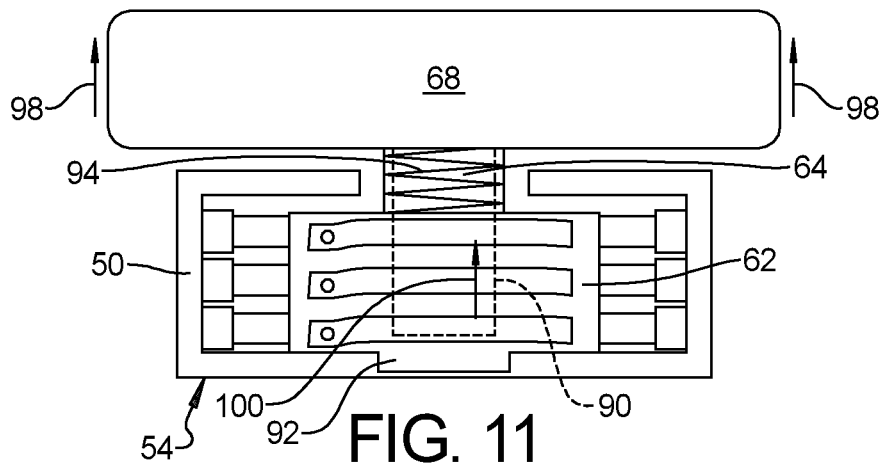
FIG. 11 is a side view of a rotary control knob assembly positioned with a track according to an exemplary embodiment of the present disclosure, wherein the knob portion and the shaft of the rotary control knob assembly are pulled to disengage the shaft from the recessed cavity.

Referring to FIG. 10 and FIG. 11, in another exemplary embodiment, the knob portion 68 includes a shaft 90 extending downward through the base 62 and the channel 56 includes at least one recessed cavity 92 formed therein. As shown in FIG. 10, the shaft 90 extends through the base 62 and engages the recessed cavity 92 to prevent sliding motion of the rotary control knob assembly 54 within the track 50. This provides a detent to keep the rotary control knob assembly 54 fixed at a location so the occupant of the vehicle will know where the rotary control knob assembly 54 is the next time they want to move it, and will also maintain the position of the rotary control knob assembly 54 while the occupant is using the knob portion 68 to provide input to the HMI 12. The knob portion 68 and the shaft 90 are biased to maintain engagement with the recessed cavity 92. As shown, a spring 94 within the neck portion 64 of the rotary control knob assembly 54 pushes the shaft 90, as indicated by arrow 96, to keep the shaft 90 engaged with the recessed cavity 92. Referring to FIG. 11, the occupant can pull the knob portion 68, as indicated by arrows 98, overcoming the biasing force of the spring 94, and disengaging the shaft 90 and the recessed cavity 92, as indicated by arrow 100, to allow sliding motion of the rotary control knob assembly 54 within the track 50.

Figure 12:
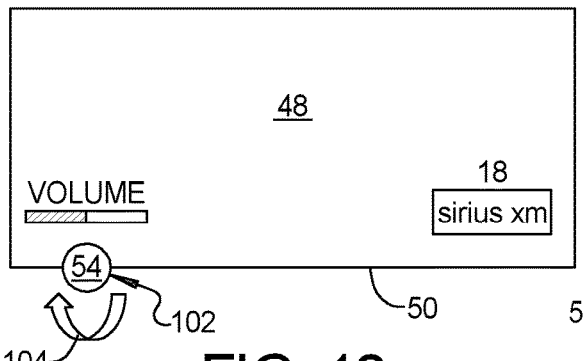
FIG. 12 is a front view of a display screen of an HMI of the present disclosure, wherein the rotary control knob assembly is positioned near a bottom left corner of the display screen adjacent a graphic on the display screen that provides information related to the volume of the radio.
Figure 13:
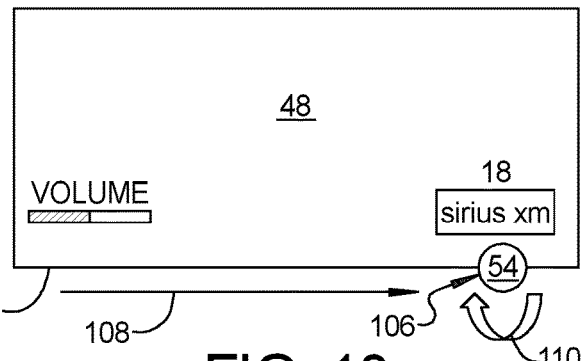
FIG. 13 is the front view of a display screen of an HMI of the present disclosure from FIG. 12, wherein the rotary control knob assembly has been slid to a position near a bottom right corner of the display screen adjacent a graphic on the display screen that provides information related to the radio station that is being played on the radio.

Referring to FIG. 12, in an example application of the HMI 12 of the present disclosure, the rotary control knob assembly 54 is at a first position 102, wherein the occupant of the vehicle 10 can rotate the knob portion 68 of the rotary control knob assembly 54, as indicated by arrow 104, to adjust the volume of the radio within the vehicle 10. As shown, the display screen 48 displays information about the volume in proximity to the rotary control knob assembly 54. Referring to FIG. 13, if the occupant desires to change the radio station, the occupant can, slide to rotary control knob assembly 54 over to a second position 106 within the track 50, as indicated by arrow 108. At the second position 106, the rotary control knob assembly 54 will allow the occupant of the vehicle 10 to change the radio station by rotating the knob portion 68, as indicated by arrow 110.

Figure 14:
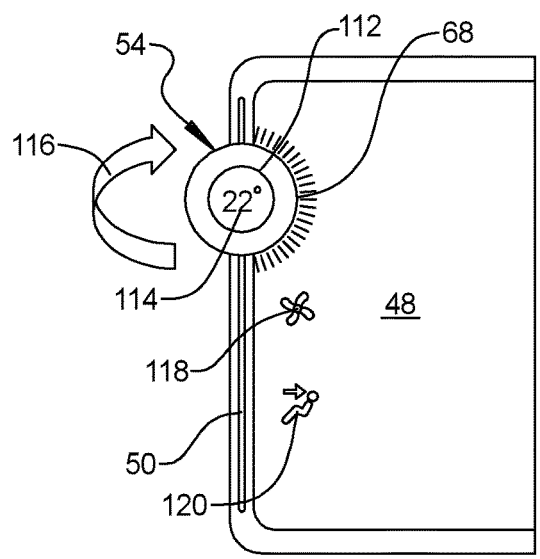
FIG. 14 is a partial front view of a display screen for an HMI of the present disclosure wherein the knob portion of the rotary control knob assembly includes a secondary display screen.

In another exemplary embodiment, the knob portion 68 of the rotary control knob assembly 54 includes a secondary display screen 112. When the rotary control knob assembly 54 is positioned within the track 50 at a location to control a selected one of the plurality of systems 28 within the vehicle, the secondary display screen 112 is adapted to display features related to the selected one of the plurality of systems 28. Referring to FIG. 14, the rotary control knob assembly 54 is located at a position such that articulation of the knob portion 68 by the occupant changes the temperature settings within the interior of the vehicle 10. As shown, when the rotary control knob assembly 54 is positioned at this location, the secondary display screen 112 displays a graphic or textual information 114 related to the adjustments being made. In FIG. 14, the temperature is displayed on the secondary screen 112 to inform the occupant of the temperature setting. As the occupant turns the knob portion 68 clockwise/counter-clockwise, as indicated by arrow 116, the displayed temperature information will go up or down accordingly.

Figure 15:
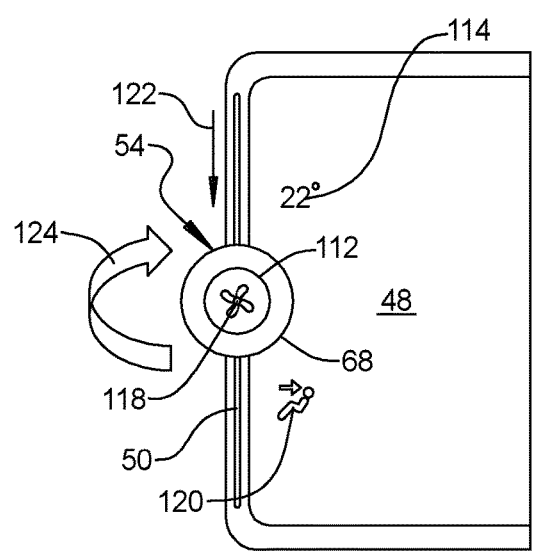
FIG. 15 is the partial front view of FIG. 14, wherein the rotary control knob assembly has been moved from a first position to a second position.

Referring again to FIG. 14, the display screen 48 also displays a fan speed graphic 118 and a air flow graphic 120. If the occupant wishes to change the fan speed, referring to FIG. 15, the occupant will slide the rotary control knob assembly 54, as indicated by arrow 122, to a position in proximity to the fan speed graphic 118. At this time, the secondary display screen 112 will stop displaying the temperature graphic 114, and the temperature graphic 114 returns to the display screen 48. When the rotary control knob assembly 54 is moved in proximity to the fan speed graphic 118, the secondary display screen 112 begins displaying the fan speed graphic 118. As the occupant turns the knob portion clockwise/counter-clockwise, as indicated by arrow 124, the displayed fan speed graphic 118 will change indicating that the fan speed is increasing or decreasing accordingly.

With reference to FIG. 12, FIG. 13, FIG. 14 and FIG. 15, the HMI 12 can be configured to display information relative to the plurality of onboard systems 28, and accordingly, configure the system to apply input from the occupant to an associated one of the vehicle systems 28, based on an occupants preferences. Thus, Referring to FIG. 12, if the occupant would rather radio station information appear in the bottom left corner of the display screen 48, and radio volume information appear in the bottom right corner of the display screen 48, the occupant may adjust the preferences of the HMI 12, and the HMI, will appropriately adjust the positioning criteria for the rotary control knob assembly such that the input from the occupant is applied to the correct one of the plurality of systems 28 within the vehicle 10, when the rotary control knob assembly is positioned in proximity to the graphic display on the display screen 48.

Figure 16:
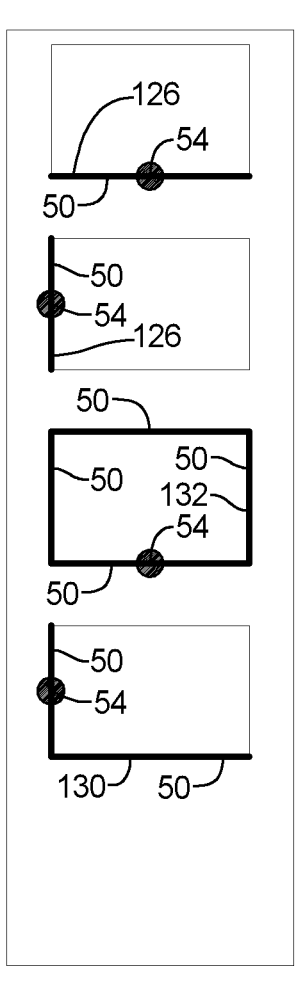
FIG. 16 is a front view of a plurality of display screens having various combinations of one track and one rotary control knob assembly.
Figure 17:
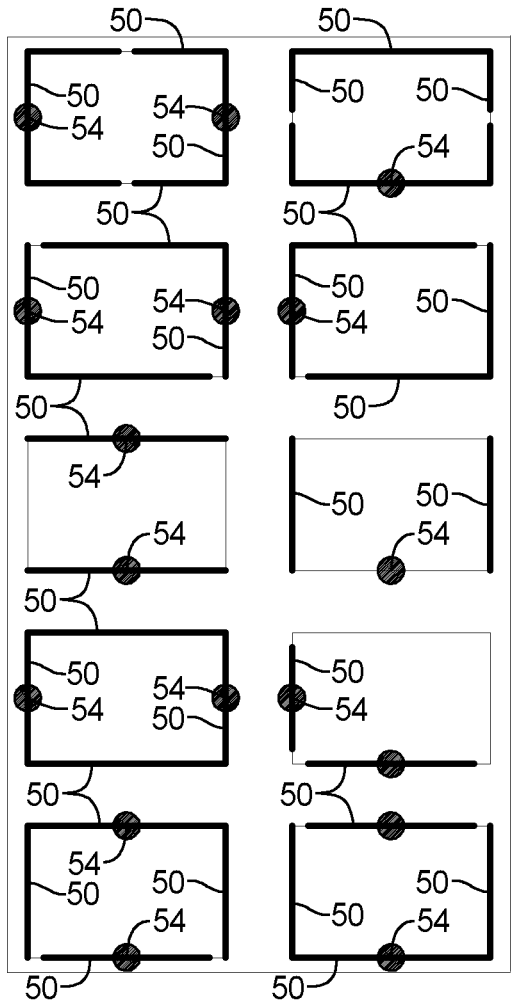
FIG. 17 is a front view of a plurality of display screens having various combinations of tone two track and two rotary control knob assemblies.
Figure 18:
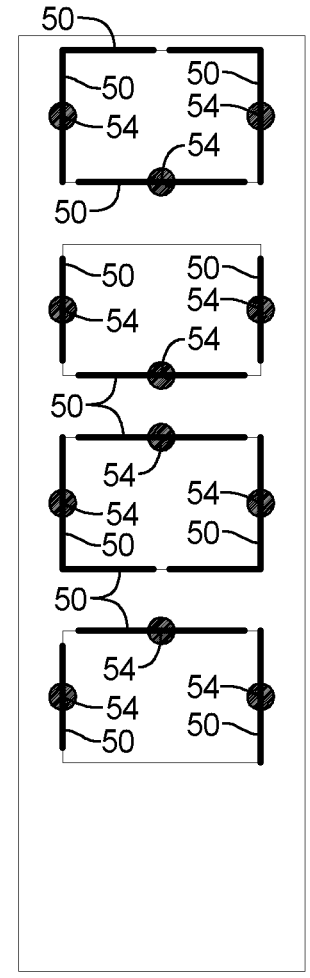
FIG. 18 is a front view of a plurality of display screens having various combinations of three tracks and three rotary control knob assemblies.

It should be understood, that an HMI 12 in accordance with the present disclosure may include a track 50 that comprises multiple discreet track sections, and may include multiple rotary control knob assemblies 54. Referring to FIG. 16, the HMI 12 may include a single track 50 and a single rotary control knob assembly 54. The track 50 may extend along one side of the outer periphery 52 of the display screen 48, as shown at 126 and 128, may extend along two sides of the outer periphery 52 of the display screen 48, as shown at 130, may extend along three sides of the outer periphery 52 or may extend around the entire outer periphery 52 of the display screen 48, and shown at 132. Referring to FIG. 17, various combinations of an HMI 12 having two tracks 50 and two rotary control knob assemblies 54 is shown. Each of the two tracks 50 may extend along one, two or three sides of the outer periphery 52 of the display screen 48. Referring to FIG. 18, various combinations of an HMI 12 having three tracks 50 and three rotary control knob assemblies 54 is shown. Each of the three tracks 50 may extend along one or two sides of the outer periphery 52 of the display screen 48. It should be understood that an HMI having any number of tracks 50 and rotary control knob assemblies 54 may be used without departing from the scope of the present disclosure.

Figure 19:
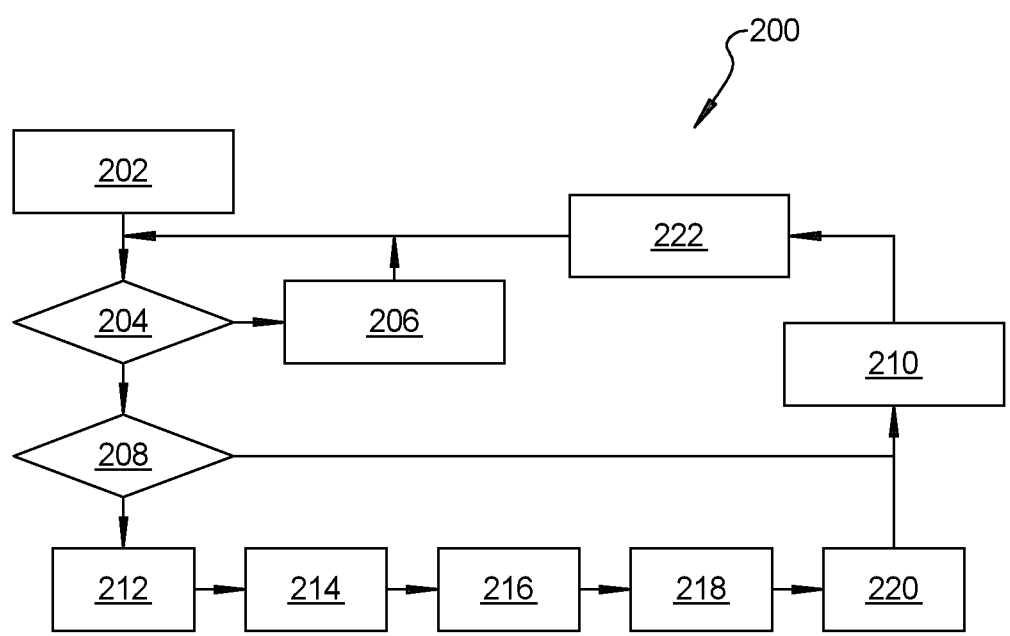
FIG. 19 is a flow chart illustrating a method according to an exemplary embodiment of the present disclosure.

Referring to FIG. 19, a method 200 of providing input to a human machine interface (HMI) 12 within a vehicle 10 includes, beginning at block 202, when the occupant enters the vehicle 10, and moving to block 204, if the occupant of the vehicle 10 does not wish to adjust the setting of any of the onboard vehicle systems 28, then, moving to block 206, the HMI 12 does nothing and the method circles back to block 204.

Moving back to block 204, if the occupant of the vehicle 10 does wish to adjust the settings of one of the plurality of onboard vehicle systems 28, then, moving to block 208, if the rotary control knob assembly is in the proper location to allow the occupant to input, via the knob portion 68 of the rotary control knob assembly 54, for the desired one of the plurality of onboard vehicle systems 28, then, moving to block 210, the method includes inputting, by the occupant, input via the knob portion 68 of the rotary control knob assembly 54.

Moving again back to block 208, if the rotary control knob assembly 54 is not in the proper location to allow the occupant to input, via the knob portion 68 of the rotary control assembly 54, for the desired one of the plurality of onboard vehicle systems 28, then, moving to block 212, the method includes moving the rotary control knob assembly 54 that is slidably supported for sliding movement within the track 50 extending along at least a portion of the peripheral edge 52 of the display screen 48 that is adapted to display information to an occupant within the vehicle 10.

Moving to block 214, the method includes stopping movement at a selected position within the track 50, and, moving to block 216, determining, with the controller 34, via communication between at least one of the plurality of conductive rails 58 within the channel 56 of the track 50 and at least one of the plurality of flexible electrically conductive fingers 70, a location of the rotary control knob assembly 54 within the track 50, and, moving to block 218, providing power to the rotary control knob assembly 54, from the controller 34, via communication between at least one of the plurality of conductive rails 58 within the channel 56 of the track 50 and at least one of the plurality of flexible electrically conductive fingers 70.

Moving from block 218 to 220, the method includes, when the rotary control knob assembly 54 is positioned within the track 50 at a location to control a selected one of the plurality of systems 28 within the vehicle 10, displaying, on a secondary display screen 112, features related to the selected one of the plurality of systems 28.

Moving from block 220 to 210, the method includes inputting, by the occupant, input via the knob portion 68 of the rotary control knob assembly 54, to the HMI 12 to control a selected one of a plurality of systems 28 within the vehicle 10, the selected one of the plurality of systems 28 determined by the selected position of the rotary control knob assembly 54 within the track 50, and, moving from block 210 to block 222, the method finally includes receiving input from the occupant of the vehicle 10, via the rotary control knob assembly 54 and communicating the input to the controller 34 via communication between at least one of the plurality of conductive rails 58 within the channel 56 of the track 50 and at least one of the plurality of flexible electrically conductive fingers 70.

In an exemplary embodiment, the track 50 defines a channel 56, the channel 56 including a plurality of electrically conductive rails 58 in communication within the controller 34, and the rotary control knob assembly 54 includes: a base 62 adapted to be slidably received within the channel 56 of the track 50, the base 62 having a four-sided shape, each of the four sides including a plurality of flexible electrically conductive fingers 70 that are biased outward and adapted to contact the plurality of conductive rails 58 within the channel 56 of the track 50 for electrical communication between the base 62 of the rotary control knob assembly 54 and the controller 34, a neck portion 64 adapted to extend outward from the base 62 through a slot 66 formed within the track 50, and a knob portion 68 adapted to allow engagement of the rotary control knob assembly 54 by the occupant of the vehicle 10, via rotation of the knob portion 68, wherein, the moving the rotary control knob assembly 54 at block 212 further includes transitioning from horizontal movement of the rotary control knob assembly 54 within a horizontal portion 50H of the track 50 to vertical movement of the rotary control knob assembly 54 within a vertical portion 50V of the track 50, and maintaining electrical communication between the base 62 of the rotary control knob assembly 54 and the controller 34.

In an exemplary embodiment, the at least one of the plurality of conductive rails 58 within the channel 56 of the track 50 that is adapted to communicate with at least one of the plurality of flexible electrically conductive fingers 70 to allow the controller 34 to determine a location of the rotary control knob assembly 54 within the track 50 includes a plurality of short segments 80 each individually in communication with the controller 34, wherein the determining, with the controller 34, via communication between at least one of the plurality of conductive rails 58 within the channel 56 of the track 50 and at least one of the plurality of flexible electrically conductive fingers 70, a location of the rotary control knob assembly 54 within the track 50, at block 216, further includes, determining, with the controller 34, a location of the rotary control knob assembly 54, based on which one of the plurality of short segments 80 is in contact with the rotary control knob assembly 54.

In another exemplary embodiment, the receiving input from the occupant of the vehicle 10, via the rotary control knob assembly 54 and communicating the input to the controller 34 via communication between at least one of the plurality of conductive rails 58 within the channel 56 of the track 50 and at least one of the plurality of flexible electrically conductive fingers 70, at block 222, further includes converting, with an encoder 84 within the base 62 of the rotary control knob assembly 54, input from the occupant of the vehicle 10, via the knob portion 68 of the rotary control knob assembly 54, to a signal that is communicated to the controller 34.

In another exemplary embodiment, the base 62 includes a foot 86 slidably positioned within a secondary channel 88, wherein, the moving the rotary control knob assembly 54 that is slidably supported for sliding movement within the track 50 extending along at least a portion of the peripheral edge 52 of the display screen 48 that is adapted to display information to the occupant within the vehicle 10, at block 212, further includes selectively actuating a magnetorheological fluid 89 within the secondary channel 88 to one of: allow sliding motion of the foot 86 within the secondary channel 88 and prevent sliding motion of the foot 86 within the secondary channel 88.

In yet another exemplary embodiment, the knob portion 68 includes a shaft 90 extending downward through the base 62 and the channel 56 includes at least one recessed cavity 92 formed therein, the shaft 90 extending through the base 62 and engaging the recessed cavity 92 to prevent sliding motion of the rotary control knob assembly 54 within the track 50, the knob portion 68 and the shaft 90 being biased to maintain engagement with the recessed cavity 92 and to allow the occupant to pull the knob portion 68 and disengage the shaft 90 and the recessed cavity 92 to allow sliding motion of the rotary control knob assembly 54, wherein, the moving the rotary control knob assembly 54 that is slidably supported for sliding movement within the track 50 extending along at least a portion of the peripheral edge 52 of the display screen 48 that is adapted to display information to the occupant within the vehicle 10, at block 212, further includes pulling the knob portion 68 of the rotary control knob assembly 54 outward and disengaging the shaft 90 and the recessed cavity 92 to allow sliding movement of the rotary control knob assembly 54 within the track 50.

A system and method of the present disclosure offers several advantages. These include the ability for an occupant of the vehicle 10 to provide input to a human machine interface 12 through a rotary control knob assembly 54 that is moveable around the display screen 48. The rotary control knob assembly 54 controlling one of a plurality of onboard vehicle systems 28 based on the location of the rotary control knob assembly 54 around the display screen 48. An occupant can feel the rotary control knob assembly 54 and move it to a general position around the display screen 48, wherein the occupant knows from past experience what vehicle system is associated with such location. Thus, the occupant can provide input one or more of a plurality of vehicle systems 28 without having to look directly at the display screen 48 to ensure the input is applied to the appropriate vehicle system.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A human machine interface (HMI) within a vehicle, comprising:
    a display screen adapted to display information to an occupant within the vehicle;
    a track extending along at least a portion of a peripheral edge of the display screen; and
    a rotary control knob assembly slidably supported within the track for sliding movement within the track and including a knob portion having a shaft extending downward through a base and the track includes at least one recessed cavity formed therein, the shaft extending through the base and engaging the recessed cavity to prevent sliding motion of the rotary control knob assembly within the track, the knob portion and the shaft being biased to maintain engagement with the recessed cavity and to allow the occupant to pull the knob and disengage the shaft and the recessed cavity to allow sliding motion of the rotary control knob assembly within the track;
    wherein, the rotary control knob assembly is adapted to allow the occupant of the vehicle to provide input to the HMI to control a selected one of a plurality of systems within the vehicle, the selected one of the plurality of systems determined by a position of the rotary control knob assembly within the track.

2. The HMI of claim 1, wherein the track defines a channel, the channel including a plurality of electrically conductive rails in communication within a controller, the recessed cavity being formed within the channel.

3. The HMI of claim 2, wherein the track includes side-walls, the plurality of electrically conductive rails being mounted onto the side walls.

4. The HMI of claim 3, wherein:
    the base is adapted to be slidably received within the channel of the track, the base including a plurality of flexible electrically conductive fingers that are biased outward and adapted to contact the plurality of conductive rails within the channel of the track for electrical communication between the base of the rotary control knob assembly and the controller;
a neck portion extends outward from the base through a slot formed within the track; and
the knob portion is adapted to allow engagement of the rotary control knob assembly by the occupant of the vehicle, via rotation of the knob portion.

5. The HMI of claim 4, wherein, the base has a four sided shape, each of the four sides including a plurality of flexible electrically conductive fingers that are biased outward and adapted to contact the plurality of conductive rails within the channel of the track, such that the rotary control knob assembly can transition from a horizontal portion of the track to a vertical portion of the track and maintain electrical communication between the base of the rotary control knob assembly and the controller.

6. The HMI of claim 4, wherein:
at least one of the plurality of conductive rails within the channel of the track is adapted to communicate with at least one of the plurality of flexible electrically conductive fingers to allow the controller to determine a location of the rotary control knob assembly within the track;
at least one of the plurality of conductive rails within the channel of the track is adapted to communicate with at least one of the plurality of flexible electrically conductive fingers to provide power to the rotary control knob assembly; and
at least one of the plurality of conductive rails within the channel of the track is adapted to communicate with at least one of the plurality of flexible electrically conductive fingers to allow input by the occupant of the vehicle, via the knob portion of the rotary control knob assembly, to be communicated to the controller.

7. The HMI of claim 6, wherein the at least one of the plurality of conductive rails within the channel of the track that is adapted to communicate with at least one of the plurality of flexible electrically conductive fingers to allow the controller to determine a location of the rotary control knob assembly within the track includes a plurality of short segments each individually in communication with the controller.

8. The HMI of claim 6, wherein the base of the rotary control knob assembly includes an encoder adapted to convert input from the occupant of the vehicle, via the knob portion of the rotary knob assembly, to a signal that is communicated to the controller.

9. The HMI of claim 6, wherein the base includes a foot slidably positioned within a secondary channel, the secondary channel adapted to selectively restrict movement of the foot therein to provide reconfigurable detents for the rotary control knob assembly.

10. The HMI of claim 9, wherein the secondary channel includes a magnetorheological fluid that can selectively be controlled to allow sliding motion of the foot within the secondary channel and to prevent sliding motion of the foot within the secondary channel.

11. The HMI of claim 6, wherein the knob portion of the rotary control knob assembly includes a secondary display screen, wherein, when the rotary control knob assembly is positioned within the track at a location to control a selected one of the plurality of systems within the vehicle, the secondary display screen is adapted to display features related to the selected one of the plurality of systems.

12. A method of providing input to a human machine interface (HMI) within a vehicle, comprising:
pulling a knob portion of a rotary control knob assembly outward and disengaging a shaft, that extends downward through a base of the rotary control knob assembly and engages a recessed cavity formed within a track extending along at least a portion of a peripheral edge of a display screen that is adapted to display information to an occupant within the vehicle, and the recessed cavity to allow sliding movement of the rotary control knob assembly within the track;
moving the rotary control knob assembly that is slidably supported for sliding movement within the track;
stopping movement at a selected position within the track; and
inputting, via the rotary control knob assembly, input to the HMI to control a selected one of a plurality of systems within the vehicle, the selected one of the plurality of systems determined by the selected position of the rotary control knob assembly within the track.

13. The method of claim 12, wherein the track defines a channel, the channel including a plurality of electrically conductive rails in communication within a controller, and the rotary control knob assembly includes:
the base is adapted to be slidably received within the channel of the track, the base having a four-sided shape, each of the four sides including a plurality of flexible electrically conductive fingers that are biased outward and adapted to contact the plurality of conductive rails within the channel of the track for electrical communication between the base of the rotary control knob assembly and the controller;
a neck portion of the rotary control knob assembly is adapted to extend outward from the base through a slot formed within the track; and
the knob portion adapted to allow engagement of the rotary control knob assembly by the occupant of the vehicle, via rotation of the knob portion;
wherein, the moving the rotary control knob assembly further includes transitioning from horizontal movement of the rotary control knob assembly within a horizontal portion of the track to vertical movement of the rotary control knob assembly within a vertical portion of the track, and maintaining electrical communication between the base of the rotary control knob assembly and the controller.

14. The method of claim 13, further including:
determining, with the controller, via communication between at least one of the plurality of conductive rails within the channel of the track and at least one of the plurality of flexible electrically conductive fingers, a location of the rotary control knob assembly within the track;
providing power to the rotary control knob assembly, from the controller, via communication between at least one of the plurality of conductive rails within the channel of the track and at least one of the plurality of flexible electrically conductive fingers; and
receiving input from the occupant of the vehicle, via the rotary control knob assembly and communicating the input to the controller via communication between at least one of the plurality of conductive rails within the channel of the track and at least one of the plurality of flexible electrically conductive fingers.

15. The method of claim 14, wherein the at least one of the plurality of conductive rails within the channel of the track that is adapted to communicate with at least one of the plurality of flexible electrically conductive fingers to allow the controller to determine a location of the rotary control knob assembly within the track includes a plurality of short segments each individually in communication with the controller, wherein the determining, with the controller, via communication between at least one of the plurality of conductive rails within the channel of the track and at least one of the plurality of flexible electrically conductive fingers, a location of the rotary control knob assembly within the track further includes, determining, with the controller, a location of the rotary control knob assembly, based on which one of the plurality of short segments is in contact with the rotary control knob assembly.

16. The method of claim 14, wherein the receiving input from the occupant of the vehicle, via the rotary control knob assembly and communicating the input to the controller via communication between at least one of the plurality of conductive rails within the channel of the track and at least one of the plurality of flexible electrically conductive fingers further includes converting, with an encoder within the base of the rotary control knob assembly, input from the occupant of the vehicle, via the knob portion of the rotary knob assembly, to a signal that is communicated to the controller.

17. The method of claim 14, wherein the knob portion of the rotary control knob assembly includes a secondary display screen, the method further including, when the rotary control knob assembly is positioned within the track at a location to control a selected one of the plurality of systems within the vehicle, displaying, on the secondary display screen, features related to the selected one of the plurality of systems.

18. A method of providing input to a human machine interface (HMI) within a vehicle, comprising:
　selectively actuating a magnetorheological fluid within a secondary channel formed within a track extending along at least a portion of a peripheral edge of a display screen, that is adapted to display information to an occupant within the vehicle, to allow sliding motion of a foot of a base of a rotary control knob assembly, that is slidably supported for sliding movement within the track, within the secondary channel;
　moving the rotary control knob assembly within the track;
　stopping movement of the rotary control knob at a selected position within the track;
　selectively actuating the magnetorheological fluid within the secondary channel to prevent sliding motion of the foot within the secondary channel; and
　inputting, via the rotary control knob assembly, input to the HMI to control a selected one of a plurality of systems within the vehicle, the selected one of the plurality of systems determined by the selected position of the rotary control knob assembly within the track.

19. The method of claim 18, wherein the track defines a channel, the channel including a plurality of electrically conductive rails in communication within a controller, and the rotary control knob assembly includes:
　the base is adapted to be slidably received within the channel of the track, the base having a four-sided shape, each of the four sides including a plurality of flexible electrically conductive fingers that are biased outward and adapted to contact the plurality of conductive rails within the channel of the track for electrical communication between the base of the rotary control knob assembly and the controller;
　a neck portion of the rotary control knob assembly is adapted to extend outward from the base through a slot formed within the track; and
　the knob portion adapted to allow engagement of the rotary control knob assembly by the occupant of the vehicle, via rotation of the knob portion;
　wherein, the moving the rotary control knob assembly further includes transitioning from horizontal movement of the rotary control knob assembly within a horizontal portion of the track to vertical movement of the rotary control knob assembly within a vertical portion of the track, and maintaining electrical communication between the base of the rotary control knob assembly and the controller.

20. The method of claim 19, further including:
　determining, with the controller, via communication between at least one of the plurality of conductive rails within the channel of the track and at least one of the plurality of flexible electrically conductive fingers, a location of the rotary control knob assembly within the track;
　providing power to the rotary control knob assembly, from the controller, via communication between at least one of the plurality of conductive rails within the channel of the track and at least one of the plurality of flexible electrically conductive fingers; and
　receiving input from the occupant of the vehicle, via the rotary control knob assembly and communicating the input to the controller via communication between at least one of the plurality of conductive rails within the channel of the track and at least one of the plurality of flexible electrically conductive fingers.

* * * * *